Patented Dec. 2, 1952

2,620,323

UNITED STATES PATENT OFFICE 2,620,323

AGE RESISTOR FOR LOW-UNSATURATION POLYMERS

Andrew F. Sayko, Westfield, N. J., assignor to Standard Oil Development Company, a corporation of Delaware No Drawing. Application March 31, 1949, Serial No. 84,770

8 Claims. (Cl. 260—41.5)

This invention relates to improvements in age resistors for low-unsaturation copolymers of isoolefins and conjugated diolefins, and to the products containing said agents.

U. S. Patent No. 2,305,412 describes the use of low-unsaturation copolymers of isoolefins, such as isobutylene, and conjugated diolefins, such as isoprene, as the base stock in the manufacture of tire curing bags.

However, when the low-unsaturation copolymers described in U. S. Patent No. 2,305,412 are used in preparing the air bags, it has been found that the polymer tends to soften and be degraded after continued exposure to high temperature, steam and air.

It has now been found that these difficulties can be overcome and the age resistance remarkably improved by the addition to the copolymer of 5% of polyisobutylene having a molecular weight of 100,000 and curing the resultant mix. A remarkably striking improvement in the age resistance of the copolymer is obtained when 5% of the isobutylene having a molecular weight of 100,000 is added and the mixture cured in the presence of paraquinone dioxime and an oxidizing agent.

Thus, the present invention provides a new and useful material for use in tire bags and which has improved resistance to aging.

The primary material of the present invention is the copolymer of isobutylene with a multiolefin prepared at low temperature by a Friedel-Crafts catalyst. The major component of the copolymer is preferably isobutylene. The minor component is a multi-olefin having from 4 to 12 or 14 carbon atoms per molecule. The preferred multi-olefins are butadiene, isoprene, dimethyl butadiene, dimethallyl, myrcene, allo-ocymene and the like. Of these materials, isoprene is at the present time regarded as the best multiolefin. The isobutylene and the multi-olefin are mixed in the ratio of a major proportion of isobutylene and a minor proportion of the isoprene, the preferred range with isoprene being from 1 to 10 parts of isoprene with 99 to 90 parts of isobutylene. High purity is desirable in both materials and it is preferable to use an isobutylene of at least 99% purity and an isoprene of at least 96% purity, although satisfactory copolymers can be made from materials of considerably lower purity.

The mixture is cooled to a temperature within the range between —40° C. and —164° C., the preferred range being between —78° C. and —103° C. The material may be cooled by the use of a refrigerating jacket upon the mixing tank and polymerizer, in which case any refrigerant which will yield the desired temperature is satisfactory. Alternatively, the cooling may be obtained by an internal refrigerant which is mixed directly with the olefinic copolymerizate. For this purpose, such materials as liquid propane, solid carbon dioxide, liquid ethane, and liquid ethylene are satisfactory, and conveniently usable, and in some instances even liquid methane is usable, although usually the temperature of boiling liquid methane is undesirably low.

The cold mixture is then polymerized by the addition thereto of a Friedel-Crafts catalyst, preferably in liquid or dissolved form. Depending upon the specific multi-olefin chosen, any of the Friedel-Crafts catalysts shown by N. O. Calloway in his article on "The Friedel-Crafts Synthesis," printed in the issue of Chemical Reviews, published for the American Chemical Society at Baltimore in 1935 in vol. XVII, No. 3, the article beginning on page 375, may be used. The preferred catalyst is a solution of aluminum chloride, titanium tetrachloride or uranium chloride, or the like, in a convenient solvent, such as ethyl or methyl chloride or carbon disulfide or ethyl dichloride or chloroform or the like. For this purpose the mono- and poly-halides are identified as alkyl halides whether they have one or more halogen substituents. With certain of the double salts, such as aluminum chlorobromide, sufficient solubility can be had in hydrocarbon solvents, such as liquid propane, liquid butane, liquid hexane and the like. The characteristic of all of these solvents is that they have freezing points below the freezing point of water, although not necessarily below the temperature of polymerization, thereby being low freezing, and will vaporize away from the dissolved Friedel-Crafts catalyst with no more than a degree or two elevation of the boiling point over the boiling point of the pure solvent, thereby being non-complex forming. It is ordinarily found that an amount of catalyst ranging from 1.5% to about 10% of the weight of mixed olefins is required to polymerize them into the high molecular weight polymer. It may be further noted that a partial copolymerization only may be obtained by limiting the amount of catalyst added.

In the polymerization reaction the liquid catalyst may be sprayed onto the surface of the rapidly-stirred, cold olefinic material, or a small high-pressure stream of catalyst may be directed into the body of the rapidly-stirred cold olefinic material. In either process, powerful and efficient stirring and agitating is required to disperse the catalyst rapidly into the cold olefinic material.

The polymerization proceeds rapidly to yield the desired polymer which precipitates out from the solution in the form of a flocculent white solid having many of the physical characteristics of raw gum rubber (caoutchouc). When the polymerization has reached the desired stage, the material is conveniently recovered by discharging the whole mixture into warm water which may contain an alcohol, an ether, an aldehyde or an organic acid to inactivate the catalyst if desired. The warm water primarily serves the purpose of flashing off the excess refrigerant, the unpolymerized olefins and catalyst solvent. The polymer is then recovered from the water suspension in any convenient manner, such as straining or filtering or otherwise, as may be convenient. The polymer is then dried either in a blanket passing through a tunnel drier or on the mill, as desired. The resulting product is a plastic, elastic material.

As so produced, the polymer shows a molecular weight, or Staudinger number, within the range between approximately 35,000 and 90,000, the minimum useful molecular weight being about 20,000, the preferred range being between 45,000 and 60,000. The material also shows an iodine number between about 1 and 10 and a maximum of about 50, although the preferred iodine number is usually about 2.5. (In the copolymerization, all of the unsaturation disappears from the isobutylene and one double linkage disappears from each multi-olefin molecule, leaving present one double linkage—for isoprene—for each multi-olefin molecule copolymerized. Accordingly, each molecule of isoprene copolymerized introduces into the polymer chain one double linkage and if there are 99 isobutylene molecules to one isoprene molecule, there results a "molecular unsaturation" of 1%.) The preferred polymerizate shows a molecular unsaturation from 1.5% to 5%.

The secondary component of the composition is the simple polymer of isobutylene. This is conveniently produced by mixing isobutylene with liquid ethylene to obtain a temperature of approximately −98° C. to −103° C. and adding to the solution approximately 2% (on the cold isobutylene) of boron trifluoride, in solution in a further portion of liquid ethylene (the cold isobutylene being vigorously stirred during the addition). The resulting polymer is also a white solid which may be recovered from the mixture in any convenient way and dried either in the tunnel drier or on the mill.

The resulting polymer preferably is prepared with a Staudinger molecular weight number within the range between 10,000–100,000 and 500,000. This material shows a very low value of unsaturation whether measured by the Wijs method, or any other.

The preparation of the copolymer of the present invention is well-shown in U. S. Patent No. 2,356,128, to which reference may be had for further details.

The resulting polymer can be cured to develop an elastic limit and a tensile strength ranging from about 1,000 and 4,500 pounds per square inch. Many methods of curing the polymer are known. Four types are particularly effective, i. e. sulfur cure, paraquinone dioxime cure, benzothiazyl disulfide cure and paraquinone dioxime-dibenzoate cure. Each of these types of cure is described below.

*Sulfur cure*

The necessary ingredients for this type of cure are sulfur and an accelerator which contains sulfur in its structure. This latter material accelerates the vulcanization process of addition to the double bond and therefore makes for a shorter cure time with a more efficient cure. A minimum of 1 part of sulfur appears necessary for a satisfactory vulcanizate. Using 4 parts or more of sulfur results in a poorer vulcanizate due to the degrading effect of the free sulfur which has not been utilized. Accelerator concentrations vary considerably; with selenium diethyl dithiocarbamate, however, best results are given by a 1–5, preferably 3 parts, concentration. At least 1 part would be necessary for an acceptable cure with no other accelerators present. Six parts of this material give poor results.

*Paraquinone dioxime cure*

A combination of paraquinone dioxime and lead oxide are capable of vulcanizing the polymer. The chemical reactions involved in the vulcanization of the polymer by quinone dioxime in the presence of an oxidizing agent appear to consist in the formation of aromatic nitroso groups which in turn react with the isoprene units in the polymer chain. Some sulfur is necessary to produce faster and more tightly vulcanized compounds. Paraquinone dioxime concentrations are from 1 to 8 and the lead oxide concentrations from 5 to 20 parts. The ratio of 6 paraquinone dioxime and 10 lead oxide is the most efficient combination. The sulfur concentration ranges between 0.5 and 4 parts, with 2 parts being preferred.

*Benzothiazyl disulfide cure*

Benzothiazyl disulfide acts as a mild oxidizing agent for paraquinone dioxime by virtue of the cleavage of the disulfide to form two mercaptan molecules. Apparently the conversion of the dioxime to the nitroso group brought about by the loss of a hydrogen atom results in the same type of vulcanization mechanism as for the paraquinone dioxime cure. The reaction in this case, however, is not as rapid as for the paraquinone dioxime lead oxide blend. The following limits apply for this particular cure: Benzothiazyl disulfide 1.0 to 6.0, preferably 4; paraquinone dioxime 1.0 to 8.0, preferably 2; sulfur .5 to 4.0, preferably 2.

*Paraquinone dioxime dibenzoate cure*

The action of this quinone is identical with that of paraquinone dioxime when reacted with lead oxide. The following concentrations are suitable: Paraquinone dioxime dibenzoate 1 to 10, preferably 6; lead oxide 5 to 20, preferably 10; sulfur .5 to 4.0, preferably 2.0.

To show the advantages of the present invention, the above-mentioned four types of cures were prepared and rebound blocks of a polymer prepared by copolymerizing a mixture of 97% isobutylene and 3% isoprene and containing polyisobutylene of varying molecular weights, were prepared from these recipes and cured for 75 minutes at 320° F. The cured blocks were subjected to a steam-air aging test of 6 cycles, each cycle consisting of (a) a 15 minute rise in steam to 400° F. followed by (b) a 15 minute exposure in steam at 400° F., followed by (c) a 30 minute exposure to 200 lbs./sq. in. of air with the temperature falling off from 400° F. to 320° F.

The results are reported in terms of the amount of hardness of the polymer before and after aging as determined by the Shore durometer test (ASTM D676-44T).

The results are tabulated below for each cure:

I. SULFUR CURES

| | |
|---|---|
| Low-unsaturation copolymer | 100 |
| Zinc oxide | 25 |
| Carbon black | 60 |
| Bardol [1] | 10 |
| Sulfur | 1 |
| Selenium diethyl dithiocarbonate | 3 |

| Parts of polyisobutylene per 100 parts of low-unsaturation polymer | Molecular weight of polyisobutylene | Shore hardness | | Shore loss | Shore loss improvement |
|---|---|---|---|---|---|
| | | Original | After aging | | |
| None | | 65 | 20 | 45 | |
| 5 | 12,000 | 60 | 20 | 40 | 5 |
| 10 | 12,000 | 59 | 18 | 41 | 4 |
| 15 | 12,000 | 56 | 17 | 39 | 6 |
| 5 | 100,000 | 62 | 35 | 27 | 18 |
| 10 | 100,000 | 62 | 25 | 37 | 8 |
| 15 | 100,000 | 60 | 25 | 35 | 10 |
| 5 | 200,000 | 65 | 30 | 35 | 10 |
| 10 | 200,000 | 62 | 27 | 35 | 10 |
| 15 | 200,000 | 62 | 25 | 37 | 8 |
| 5 | 240,000 | 70 | 36 | 34 | 11 |
| 10 | 240,000 | 64 | 20 | 44 | 1 |
| 15 | 240,000 | 60 | 28 | 32 | 13 |

[1] A refined coal tar fraction, having the following properties: Dark brown liquid with distinct coal-tar oil odor. Specific gravity, 1.07–1.12. Engler specific viscosity at 25° C.=4.0 max. Distillation range, 1% max. at 210° C., 60% min. at 355° C.

II. PARA QUINONE DIOXIME CURES

| | |
|---|---|
| Low-unsaturation copolymers | 100 |
| Zinc oxide | 25 |
| Carbon black | 60 |
| Mentor-28 [1] | 10 |
| Sulfur | 2 |
| Paraquinone dioxime | 2 |
| Lead oxide | 10 |

| Parts of polyisobutylene per 100 parts of low-unsaturation polymer | Molecular weight of polyisobutylene | Shore hardness | | Shore loss | Shore loss improvement |
|---|---|---|---|---|---|
| | | Original | After aging | | |
| None | | 67 | 28 | 39 | |
| 5 | 12,000 | 65 | 31 | 34 | 5 |
| 10 | 12,000 | 62 | 31 | 29 | 10 |
| 15 | 12,000 | 59 | 23 | 36 | 3 |
| 5 | 100,000 | 61 | 47 | 14 | 25 |
| 10 | 100,000 | 60 | 37 | 23 | 16 |
| 15 | 100,000 | 59 | 40 | 19 | 20 |
| 5 | 200,000 | 63 | 40 | 23 | 16 |
| 10 | 200,000 | 60 | 40 | 20 | 19 |
| 15 | 200,000 | 62 | 42 | 20 | 19 |
| 5 | 240,000 | 60 | 40 | 20 | 19 |
| 10 | 240,000 | 61 | 40 | 19 | 20 |
| 15 | 240,000 | 60 | 40 | 20 | 19 |

[1] A treated and filtered naphthenic distillate obtained from Rhodessa or northern Louisiana type crude having the following properties: Colorless liquid, API gravity at 60° F., 39.5. Saybolt color, 15. Pensky flash, 250° F. Fire test, 300° F. Pour point, +25° F.

III. BENZOTHIAZYL DISULFIDE CURES

| | |
|---|---|
| Low-unsaturation copolymer | 100 |
| Zinc oxide | 25 |
| Carbon black | 100 |
| Sulfur | 2 |
| Paraquinone dioxime | 2 |
| Benzothiazyl disulfide | 2 |

| Parts of polyisobutylene per 100 parts of low-unsaturation polymer | Molecular weight of polyisobutylene | Shore hardness | | Shore loss | Shore loss improvement |
|---|---|---|---|---|---|
| | | Original | After aging | | |
| None | | 73 | 37 | 36 | |
| 5 | 12,000 | 70 | 35 | 35 | 1 |
| 10 | 12,000 | 65 | 30 | 35 | 1 |
| 15 | 12,000 | 62 | 31 | 31 | 5 |
| 5 | 100,000 | 68 | 47 | 21 | 15 |
| 10 | 100,000 | 68 | 43 | 25 | 11 |
| 15 | 100,000 | 67 | 40 | 27 | 9 |
| 5 | 200,000 | 75 | 36 | 29 | 7 |
| 10 | 200,000 | 70 | 33 | 37 | −1 |
| 15 | 200,000 | 71 | 30 | 41 | −5 |
| 5 | 240,000 | 75 | 30 | 35 | 1 |
| 10 | 240,000 | 73 | 30 | 43 | −7 |
| 15 | 240,000 | 67 | 30 | 37 | −1 |

IV. PARAQUINONE DIOXIME BENZOATE CURES

| | |
|---|---|
| Low-unsaturation copolymer | 100 |
| Zinc oxide | 25 |
| Carbon black | 60 |
| Sulfur | 2 |
| Lead oxide | 10 |
| Paraquinone dioxime dibenzoate | 6 |

| Parts of polyisobutylene per 100 parts of low-unsaturation polymer | Molecular weight of polyisobutylene | Shore hardness | | Shore loss | Shore loss improvement |
|---|---|---|---|---|---|
| | | Original | After aging | | |
| None | | 74 | 24 | 50 | |
| 5 | 12,000 | 71 | 27 | 44 | 6 |
| 10 | 12,000 | 68 | 28 | 40 | 10 |
| 15 | 12,000 | 65 | 23 | 42 | 8 |
| 5 | 100,000 | 68 | 37 | 41 | 19 |
| 10 | 100,000 | 70 | 22 | 48 | 2 |
| 15 | 100,000 | 67 | 20 | 47 | 3 |
| 5 | 200,000 | 75 | 34 | 41 | 9 |
| 10 | 200,000 | 74 | 34 | 40 | 10 |
| 15 | 200,000 | 69 | 25 | 34 | 16 |
| 5 | 240,000 | 75 | 40 | 35 | 15 |
| 10 | 240,000 | 74 | 34 | 40 | 10 |
| 15 | 240,000 | 69 | 32 | 37 | 13 |

From the above data it is very clear that the addition of 5% of polyisobutylene having a molecular weight of 100,000 to each of the four recipes improves the age resistance of the low unsaturation copolymer as evidenced by the low Shore hardness loss in each case. The data also show the remarkably striking improvement made when using the paraquinone dioxime cure. The shore loss in this case is markedly less than for any of the other cures. It is also important to notice that adding more than 5% of the polyisobutylene of molecular weight 100,000 actually reduces the resistance of the low-unsaturation copolymer to aging.

The nature and objects of the present invention having been thus described and illustrated, what is claimed as new and useful and is desired to be secured by Letters Patent is:

1. A composition according to claim 6 in which the copolymer is formed from a major proportion of isobutylene and a minor proportion of isoprene.

2. A composition according to claim 6 in which the isoolefin is present in the ratio of 70 to 99½ parts and the diolefin is present in the ratio of 30 to ½ parts.

3. A composition of matter consisting of 100 parts of a copolymer of 97% isobutylene and 3% isoprene, 25 parts of zinc oxide, 60 parts of carbon black, 2 parts of sulfur, 2 parts of paraquinone dioxime, 10 parts of lead oxide and 5 parts of polyisobutylene having a Staudinger molecular weight number of 100,000 per 100 parts of the copolymer, which composition has been cured for 75 minutes at 320° F.

4. The process according to claim 6 in which the copolymer is a copolymer of a major proportion of isobutylene and a minor proportion of a diolefin.

5. The process according to claim 4 in which the mixture of copolymer and isobutylene is cured in the presence of paraquinone dioxime and lead oxide.

6. A composition of matter comprising a cured low unsaturation copolymer of a major proportion of an isoolefin and a minor proportion of a diolefin containing 5 parts of polyisobutylene having a molecular weight number of 100,000 per hundred parts of copolymers, said copolymer having a Staudinger molecular weight number between 45,000 and 60,000 and being cured with paraquinone dioxime, sulfur and an oxidizing agent.

7. A process of improving the age resistance of a copolymer of a major proportion of an isoolefin and a minor proportion of a diolefin which copolymer has a molecular weight number between 45,000 and 60,000 which comprises adding to said copolymer 5 parts of polyisobutylene having a Staudinger molecular weight number of 100,000 per hundred parts of copolymer and curing the mixture with paraquinone dioxime, sulfur and an oxidizing agent.

8. A composition of matter comprising a major proportion of a copolymer of 97% isobutylene and 3% isoprene, 5 parts of polyisobutylene having a Staudinger molecular weight number of 100,000, 0.5 to 4 parts sulfur, 1 to 8 parts paraquinone dioxime and 5 to 20 parts of lead oxide per 100 parts of the copolymer which composition has been cured for 75 minutes at 320° F.

ANDREW F. SAYKO.

REFERENCES CITED

The following references are of record in the file of this patent:

UNITED STATES PATENTS

| Number | Name | Date |
|---|---|---|
| 2,392,847 | Frolich | Jan. 15, 1946 |
| 2,445,283 | Sterrett | July 13, 1948 |

OTHER REFERENCES

Flory: Jor. Am. Chem. Soc., vol. 65, Mar. 1943, pp. 372–382.